United States Patent [19]

Miyazaki et al.

[11] Patent Number: 4,562,164

[45] Date of Patent: Dec. 31, 1985

[54] INSULATION OF A COIL USED IN ELECTRICAL APPARATUS

[75] Inventors: Haruo Miyazaki; Yasuaki Yamasaki; Tsutomu Oshiyama, all of Kitakyushu, Japan

[73] Assignee: Nikkiso Co. Ltd., Tokyo, Japan

[21] Appl. No.: 693,767

[22] Filed: Jan. 23, 1985

Related U.S. Application Data

[63] Continuation-in-part of Ser. No. 512,908, Jul. 11, 1983, abandoned, which is a continuation-in-part of Ser. No. 270,392, Jun. 4, 1981, abandoned.

[51] Int. Cl.⁴ .............. C04B 33/32; C04B 35/00; H01B 3/02; H02K 3/30
[52] U.S. Cl. .............. 501/151; 106/287.1; 106/DIG. 3; 174/110 R; 174/110 S; 252/567; 264/61; 310/214; 310/215; 428/369; 428/370; 428/450; 501/154
[58] Field of Search .............. 174/110 R, 110 S; 106/DIG. 3, 287.1; 252/567; 264/61; 310/214, 215; 428/369, 370, 450; 501/151, 154

[56] References Cited

U.S. PATENT DOCUMENTS

| | | | |
|---|---|---|---|
| 2,595,730 | 5/1952 | Swiss et al. | 106/DIG. 3 |
| 2,939,399 | 6/1960 | Rutschi . | |
| 3,057,741 | 10/1962 | Moore | 106/DIG. 3 |
| 3,777,198 | 12/1973 | Anderson et al. | 310/43 |
| 3,852,137 | 12/1974 | Balke et al. | 156/196 |
| 3,870,910 | 11/1973 | Fussner . | |
| 4,045,241 | 8/1977 | Daimon et al. . | |
| 4,212,914 | 7/1980 | Ponomareva . | |
| 4,275,319 | 6/1979 | Davis . | |

Primary Examiner—James C. Cannon

[57] ABSTRACT

A ceramic-like high temperature insulation for electrical coils is provided by mixing a silicone resin, synthetic fluoro-mica and a devitrified mica glass, impregnating an electrical coil with such material, curing the material and then treating the material to an elevated temperature about 300° C. The elevated temperature treatment may be effected either prior to or during use of the coil.

5 Claims, 5 Drawing Figures

INSULATION OF A COIL USED IN ELECTRICAL APPARATUS

CROSS REFERENCES TO RELATED APPLICATIONS

This application is a continuation-in-part of our earlier application Ser. No. 512,908 filed July 11, 1983, now abanonded which application in turn is a continuation-in-part of application Ser. No. 270,392 filed June 4, 1981, now abandoned. The subject of this application is also related to that of application Ser. No. 529,800 filed Sept. 6, 1983 and application No. 646,040 filed Aug. 30, 1984, which latter is a continuation of application Ser. No. 313,766 filed Oct. 22, 1981, now abandoned, at least to the extent these applications are directed to an improved insulation for a coil for use in electrical apparatus.

FIELD OF THE INVENTION

This invention relates to a high temperature insulation for a coil for use in electrical apparatus, which insulation maintains dimensional stability and insulating properties at temperatures above 300° C.

BACKGROUND OF THE INVENTION

Heretofore the insulation for coils used in rotary electric apparatus and the like has been formed by placing an insulating layer of tapes or sheets, mainly consisting of synthetic resin or natural mica, along an inner surface of a slot adapted to receive the coil. The coil is placed into the slot and then coated or impregnanted with an impregnant consisting of a suspension of a natural laminated mica in a solution of organo-silicon compound thereby to fill the gaps formed between the coil and the insulating layer as well as the inner gaps of the coil per se. With such insulation, however, the organo-silicon compound is thermally adversely affected at temperatures above about 300° C. with undesired loss of bonding between the filled insulating medium and the insulating layer, with consequent reduction of the mechanical and dielectric strength of the insulation.

SUMMARY OF THE INVENTION

A general object of the invention is to eliminate the disadvantages of the conventional insulation hereinbefore described and to achieve an improvement thereover by providing an insulation for an electrical coil which may be used at temperatures above 300° C. with negligible reduction of the mechanical and dielectric strengths of the insulation.

To achieve the foregoing object, an insulation according to the invention, for a coil used in electrical apparatus is characterized in that an insulated wire is wound to form a coil which is then coated or impregnated with an impregnant comprising an organo-silicon compound, i.e., a silicone resin and a synthetic fluoro-mica in an organic solvent, followed by curing. After coating or impregnating the coil with the impregnant and curing the resin, the silicone resin thus impregnated and cured is at least partially thermally decomposed by heating above about 300° C. in a separate heating step or by subjecting the impregnated coil to temperatures above about 300° C. in its environ of use. By thus heating the impregnated and cured coil insulation at temperatures above about 300° C., organic radicals are removed from the silicone resin which is thus converted to polysiloxane which is then exposed to a fluoro-compound derived from the synthetic fluoro-mica contained in the impregnant (the fluoro-compound is believed to decrease the melting point of the polysiloxane). The fluoro-compound is vaporized from the synthetic fluoro-mica at the same temperature as that at which the silicone resin is thermally decomposed to provide on combining the silicone resin and the synthetic fluoromica a ceramic-like insulation for the coil, as more fully hereinafter described.

The impregnant of the invention is prepared by suspending small pieces of synthetic fluoro-mica having a length of not more than 5 $\mu$m with a diameter of 0.1 to 5 $\mu$m in a solution of organo-silicon compound, or silicone resin, in a weight ratio of not less than 1:1 with an organic solvent. The organic solvent may be one or more of xylene, butylcellosolve and/or cellosolve acetate or other suitable solvent for the silicone resin.

The impregnant and organic solvent may be provided in a bath into which the coil to be treated is immersed to impregnate the coil with the impregnant. The impregnated coil is then cured under conditions hereinafter disclosed.

The insulation of the coil for the electric apparatus may be used in an iron core, in which case a slot is formed in the iron core. An insulating sheet for earth of a double sided mica paper is circumferentially placed in the slot. An interphase insulating sheet of a laminated mica paper is placed between the conductive coils. A wedge member is inserted in the slot and used for supporting the elements. The wire of the conductive coil is preferably coated with nickel.

ObJects and advantages of the invention will become obvious after considering the detailed description of the invention in connection with the preferred embodiments thereof shown in the accompanying drawings.

PREFERRED EMBODIMENTS OF THE INVENTION

Figure 1:
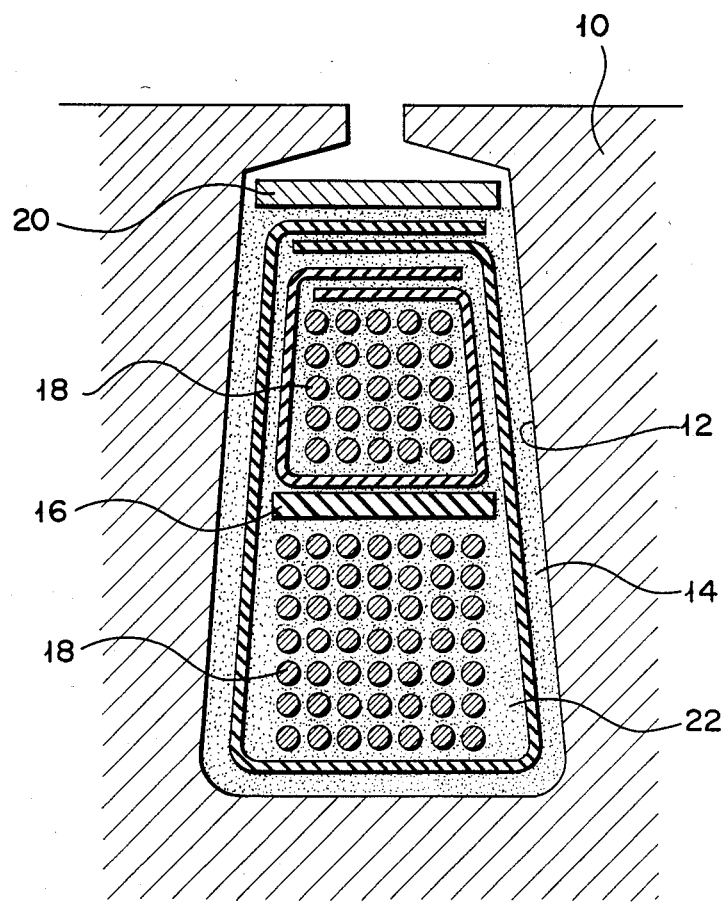
FIG. 1 shows a sectional side view of an insulation of a coil for electric apparatus according to the present invention.

In FIG. 1, an insulation of a coil for an electric apparatus is shown for use in an iron core 10. A slot 12 is formed in the iron core 10. An insulating sheet for earth (ground) of a double sided mica paper 14 is circumferentially placed in the slot 12. An interphase insulating sheet of a laminated mica plate 16 is placed between conductive coils 18, 18. A wedge member 20 is placed as a covering and support for the elements. The coil is preferably made of copper wire, the surface of which is coated with nickel for protection against thermal oxidation.

An impregnant 22 for the coils 18 may be prepared by suspending small pieces of synthetic fluoro-mica having a length of not more than 5 μm with a diameter of 0.1 to 5 μm in a solution of an organo-silicon compound, or silicone resin, in a weight ratio of not less than 1:1 of the solvent to the solid material used.

The term "organo-silicon compound" for purposes of this description is synonymous with the term "silicone resin". In a publication entitled "Silicones in Protective Coatings" by Lawrence H. Brown and published by Dow Corning Corporation, Midland, Michigan, a complete detailed dissertation is given on the exact chemical composition of such silicone resins. The silicone materials disclosed in the cited publication which decompose at temperatures above about 300° C. and which have their melting temperatures reduced by the fluoro-compound vaporized from the synthetic fluoro-mica may be used for purpose of this invention.

A suspension of the silicone resin and the synthetic fluoro-mica is mixed with an organic solvent which may comprise one or more of xylene, butylcellosolve and/or cellosolve acetate to obtain the impregnant. Thereafter, the coil is impregnated or coated with the impregnant, preferably in a bath of the impregnant, and then cured. After the impregnation and curing, the resulting coil may separately be preheated to not lower than 300° C. or used in its normal environs at temperatures not lower than 300° C., for example in an electric motor, thereby to allow organic radicals to be removed from the silicone resin for conversion of the latter to polysiloxane, which is then subjected to the fluoro-compounds such as $SiF_4$, KF and the like, vaporized from the synthetic fluoro-mica at the same temperature as that at which thermal decomposition of the silicone resin occurs thereby to reduce the melting point of the polysiloxane for reaction with residual synthetic fluoro-mica to form the desired ceramiclike insulation. Thus, during actual use of the coil in the electric motor or on preheating the coil at an elevated temperature not lower than 300° C., a ceramic formation is obtained. As described herein, the term "ceramic formation" signifies the formation of a substance having ceramic type properties, such as high heat resistance, insulating properties and mechanical strength, through a fusing action or reaction between a component of the synthetic fluoro-mica and the siloxane derived from the silicone resin, or organo-silicon compound. In lieu of immersion, the impregnant can be applied as a coating to the coil by spraying or other suitable means.

Figure 2:
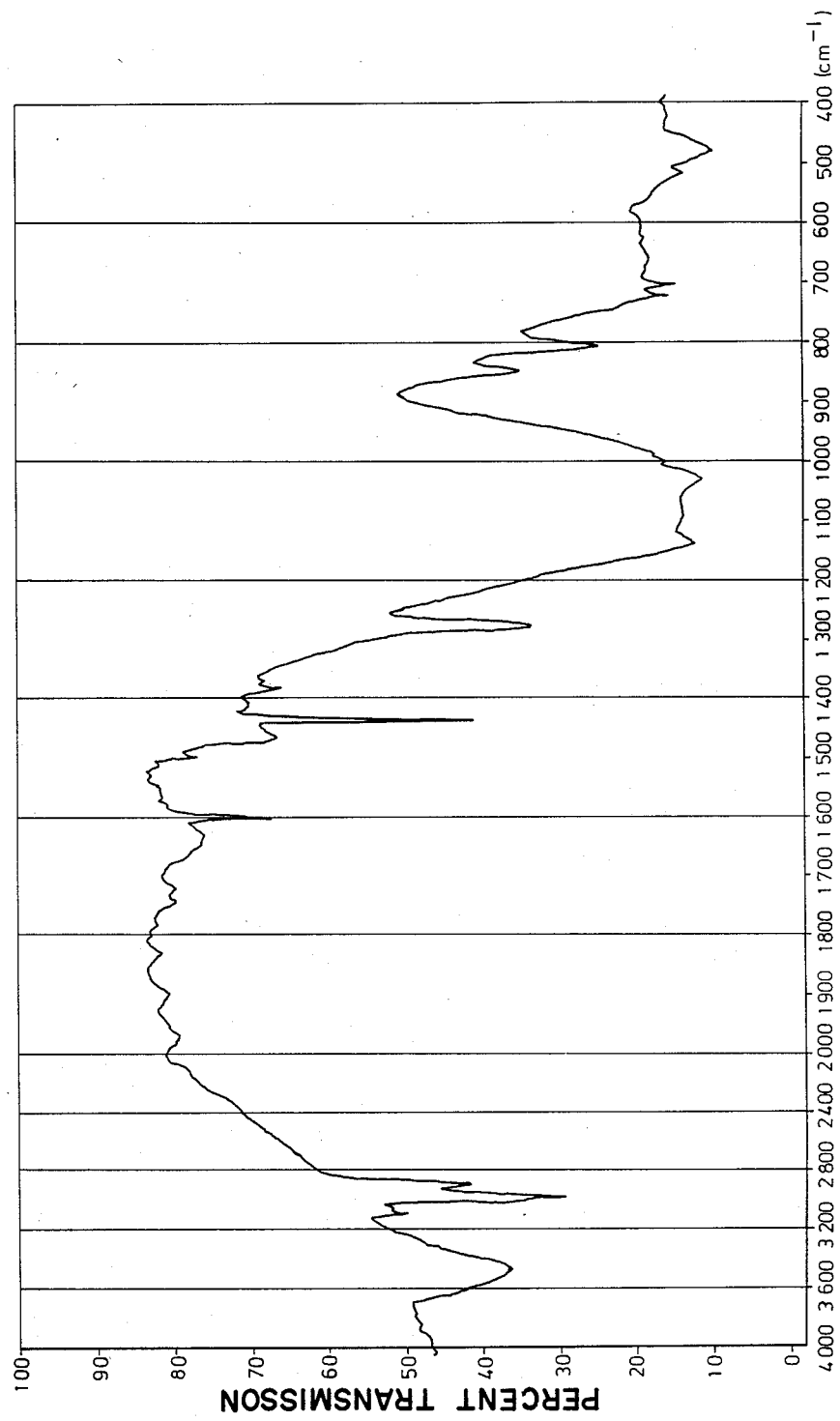
FIG. 2 is an infrared absorption diagram of a cured polymethylphenyl silicone resin (KR-282) suitable for use in the invention.

A polymethylphenyl silicone resin (KR282 sold by Shinetsu Chemical Co.) has been found to be effective in practicing the invention, but other silicones such as polymethyl silicones and polyphenyl silicones can be used with the proviso that the silicone resin used be at least partially dissociatable at temperatures above about 300° C., evidenced by loss of organic radicals from the silicone resin, and conversion thereof to polysiloxane. The dissociation of the resin is evidenced, as indicated, by weight loss or may be determined by other analytical methods such as by an infra-red absorption spectrum of the silicone material. FIG. 2, for example, shows the infra-red absorption spectrum for a cured polymethylphenol silicone resin (KR-282) cured at 200° C. for 15 hours and having the following basic structure:

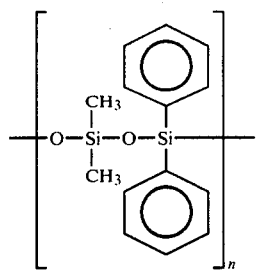

FIG. 2 is an infra-red absorption pattern for methlyphenyl silicone showing characteristic absorptions at 1435 cm$^{-1}$ attributable to phenyl silicon, at 1266 cm$^{-1}$ attributable to methyl silicon linkages and at 1000–1150 cm$^{-1}$ attributable to oxygen silicon linkages. The absorption diagram of FIG. 2 confirms the above chemical structure of the polymethylphenyl silicone resin.

Figure 3:
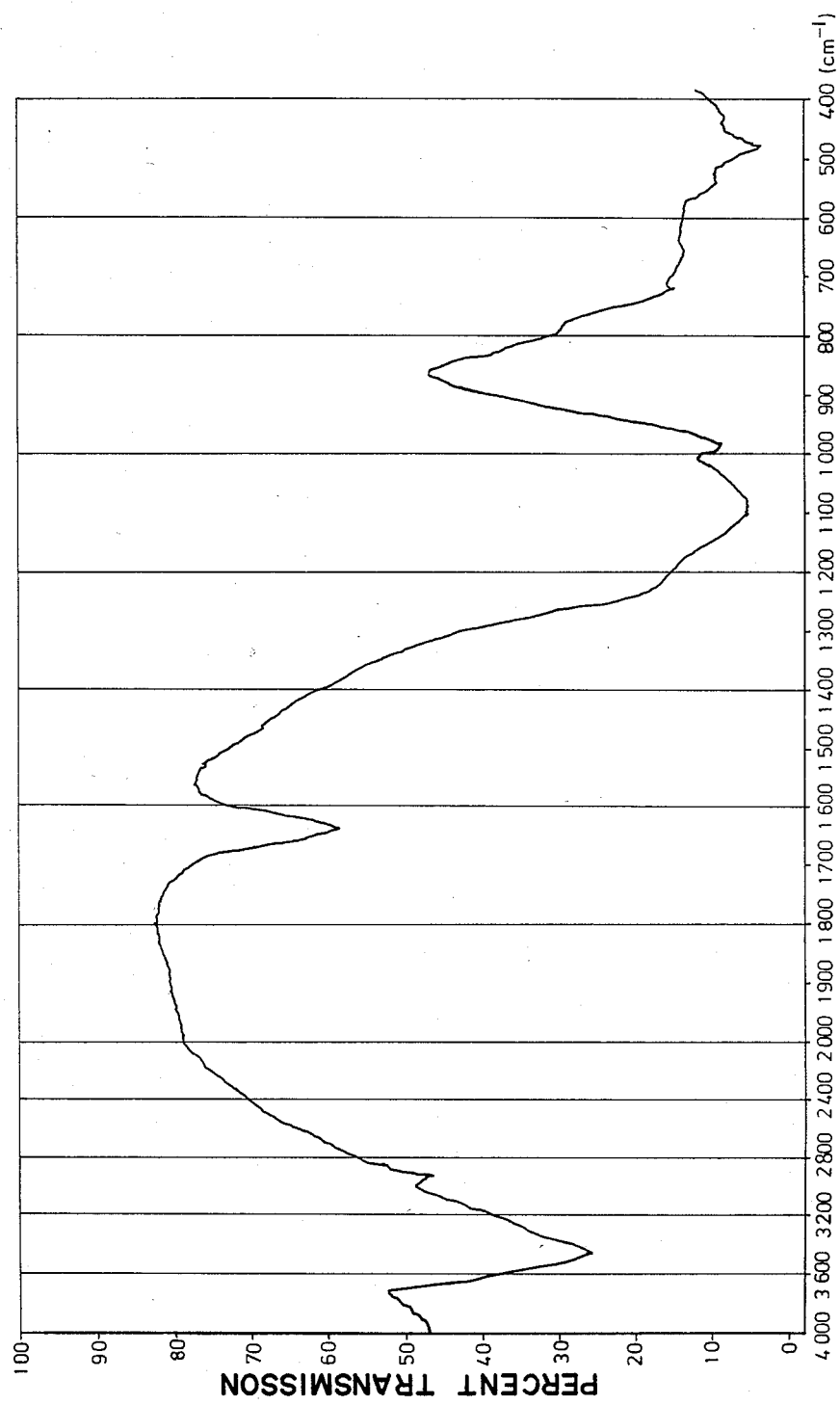
FIG. 3 is an infrared absorption diagram for the silicone resin of FIG. 2 obtained after the resin has been heated at 400° C. for 1000 hours.

FIG. 3 is an infra-red absorption diagram of the same polymethylphenyl silicone resin as in FIG. 2 obtained after heating the resin at about 400° C. for 1000 hours. It will be noted from FIG. 3 that the absorption patterns of 1266 cm$^{-1}$ and 1435 cm$^{-1}$ are not observed, thus substantiating that the silicone resin has substantially lost its methyl and phenyl radicals and has converted to a polysiloxane. Stated differently, the organic radicals are thermally dissociated from the resin leaving the silicon oxygen backbone of the resin as a polysiloxane. After commencement of thermal dissociation of the silicone resin above about 300° C., the thermal dissociation progressively increases with increasing temperature and time, until the silicone resin is virtually completely dissociated.

Figure 4:
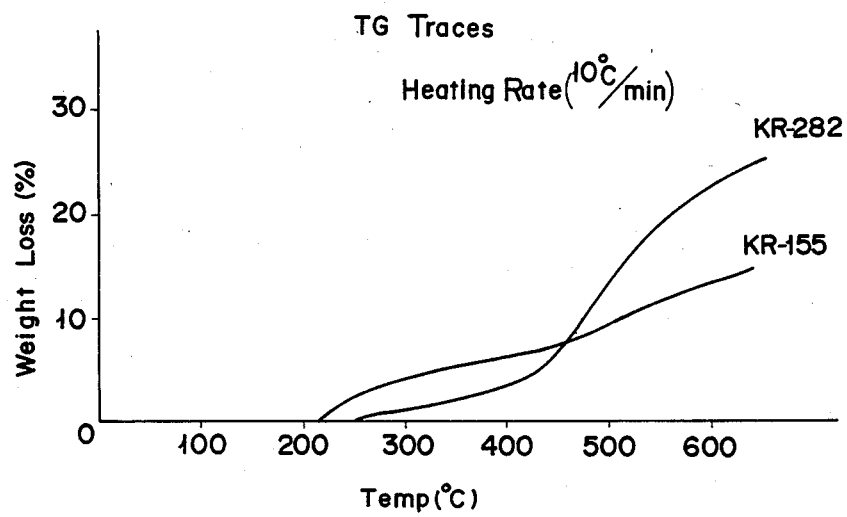
FIG. 4 is a plot of the weight loss of two silicone resins experienced when subjected to progressive high temperature heating.

FIG. 4 is a plot of the weight loss of two silicone resins with increasing temperature. The weight loss as already noted is due to thermal dissociation of the organic radicals of the resin leaving the siloxane backbone of the resin. In FIG. 4, the heating rate is 10° C./min. The curve identified as KR 282 is for the polymethylphenyl silicone resin for which the infra-red absorption pattern is shown in FIG. 2, while the curve identified as KR-155 is for another commercially available silicone resin.

Figure 5:
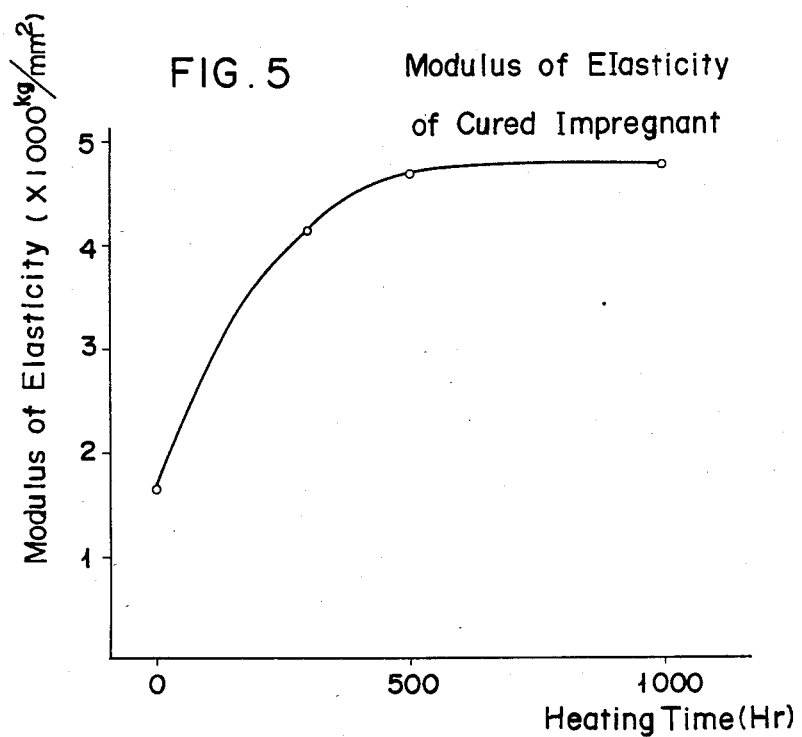
FIG. 5 is a plot of the modulus of elasticity of the coil impregnant of the invention after heating at about 400° C. at from 0 to 1000 hours.

Silicone resins are known to become brittle when they lose their organic radicals during thermal decomposition. Surprisingly, applicants have determined that if the silicone resin is admixed, for example, with a synthetic fluoro-mica commonly available as PDM KM 325 from Topy Industries Ltd., and heated above 300° C., the silicone resin, instead of being brittle, will be converted into a hard ceramic-like material having an increased modulus of elasticity. This is illustrated in FIG. 5 in which the modulus of elasticity of a mixture of silicone resin with a synthetic fluoro-mica (PDM KM 325), containing about 20% of devitrified mica glass, is plotted against heating time, in hours, at 400° C. The mixture of silicone resin and synthetic fluoro-mica, containing about 20% of devitrified mica glass, prior to heating at about 400° C. was cured at 200° C. for 15 hours. No change in the usual properties normally obtained on curing were observed. In other words, no change in the usual modulus of elasticity was noted after the normal curing of the impregnant at 200° C. for about 2 to 15 hours or more. However, when the resin mixture was further heated, after curing, at about 400°

C.; i.e. within the thermal decomposition range, the modulus of elasticity, which begins at a value between 1 and 2, rapidly increased to a value between 4 and 5 ($\times 100$ Kg/$\mu$m$^2$).

While the exact mechanism by virtue of which the improved ceramic-like insulation for a coil is obtained is not presently known, and applicants do not wish to be held to any theory for the action which may take place, it is presently believed that the synthetic fluoro-mica, such as a potassium tetra silicon mica [$KMg_{2.5}(Si_4O_{10})F_2$], when subjected to the same temperatures which cause the silicone resin to thermally dissociate, releases fluoro compound or compounds such as $SiF_4$ and $KF$ in vaporized form which modifies the properties of polysiloxane by reducing its melting point, thereby facilitating reaction of the modified siloxane with residual synthetic fluoro-mica. This theory is predicated on our finding that the ceramic-like material of the invention is not formed at elevated temperatures above about 300° C. when only the usual filler materials are present such as $TiO_2$, $Al_2O_3$, $Fe_2O_3$ or $ZnO$ (frequently used for heat resistant paints) in the impregnant. Hence, we have concluded the filler does not enter into a reaction with or bind the polysiloxane. In fact, in the absence of the synthetic fluoromica only a brittle siloxane material with a decreased modulus of elasticity is formed. However, the inclusion in the impregnant of the synthetic fluoro-mica, advantageously containing vitreous material, leads to the ceramic-like material formation for insulating the coil. We have also determined that a ceramic-like coil insulating material will not be formed at elevated temperatures above about 300° C. if a mica other than a synthetic fluoro-mica is used in the coil impregnant. By including in the impregnant the silicone resins herein contemplated, such as KR-282, together with a synthetica fluoro-mica such as PDM KM 325 we obtain a ceramic modulus of elasticity like insulation which has a high/and thus not brittle as is the case for normally cured silicone resin when used as insulation, and considerably tougher. For example, when a solvated polymethylphenyl silicone resin was mixed with calcined powder of natural mica and a film of the material cured at 200° C. for between 2 to 15 hours than heated at 400° C. for 1000 hours, the resulting film could be scraped from an underlying surface with the lead of a sharpened pencil having a hardness of 1 H (JIS - Japanese Industrial Standard). On the other hand, if a solvated polymethylphenyl silicone resin is mixed with synthetic fluoro-mica, formed as a film, cured subsequently heated at the same temperatures and time, the resulting film cannot be scraped or scratched from the underlying surface with the lead of a sharpened pencil having a hardness of 7 H (JIS on the same scale).

In one embodiment of an insulation for a coil for a 2.2 KW motor having an iron core 10 formed with the slots 12, there are inserted the insulating sheet for earth 14, and the wedge member 20 which are preheated at 120° C. to remove the moisture of each material. Thereafter, the iron core is cooled between about 40°-50° C. and is then immersed for about 10 minutes in the solution of silicone resin containing the suspended synthetic fluoromica. The impregnated coil is then dried in air for about one hour and thereafter heat-dried at about 80° C. for two hours. The coil may then be heated at about 120° C. for two hours or more to remove the solvent from the impregnant. The impregnant coil is then heated at about 200° C. for between 2 to 15 hours or more to cure the impregnant. The impregnated and cured coil thustreated is then subjected to further heating at not less than 300° C. and preferably at about 400° C. for a time sufficient to thermally dissociate the silicone resin and for vaporization of the fluoro-compound for reducing the melting temperature of the siloxane thus obtained. The further heating may be performed separately or during operation of the motor, which provides the necessary elevated temperature environment of not lower than 300° C., to convert the impregnant to a ceramic-like material.

The following table compares the insulated coil of the invention with an insulated coil impregnated with TEFLON R material. The table demonstrates that exposure of a heat-resistant coil insulated with TEFLON and heated to about 400° C. for about 1300 hours reduces greatly the dielectric strength of the TEFLON insulation with loss of the function of the apparatus, whereas no reduction of the dielectric strength may be seen in the insulated coil according to the invention even after being exposed to about 400° C. for 1400 hours.

|  | Invented Coil | | Insulated Coil with TEFLON Material (Unit:KV) | |
| --- | --- | --- | --- | --- |
|  | Initial | After use at 400° C. for 1400 hours | Initial | After use at 400° C. for 1300 hours |
| Dielectric Strength between phases | 3.95 | 3.92 | 3.45 | 1.04 |
| Dielectric Strength for earth sheet | 3.80 | 4.32 | 4.80 | 0.90 |

Specific Examples (1) Preparation of an Impregnating Agent

The Impregnating agent was prepared by suspending synthetic fluoro-mica and pigment in a silicone resin containing an organic solvent as follows:

The synthetic fluoro-mica used herein may be prepared by melting a composition in a molar ratio of $0.5K_2O: 1.5MgO: 1.1MgF_2$ at $4SiO_2$ at 1400° C. and cooling the resulting melt to approximately 1000° over a period of 20 minutes and then to room temperature to form a sintered mass containing about 80% of fluorotetrasilic mica crystal, or crystalline potassium tetra silicon mica, [$KMg_{2.5}(Si_4O_{10})F_2$] and about 20% of vitreous matter, which mass in turn is pulverized and then sieved through 350 mesh screen to obtain finely divided synthetic fluoro-mica powder. (The above synthetic fluoro-mica is commercially available as FDM KM325 from Topy Industries Limited).

The impregnating agent is then prepared by kneading in a ball mill for 3 hours a formulation consisting of 100 parts of a composition containing, by weight, 58% of the said synthetic fluoro-mica powder, 32% of silicone resin (calculated as solid matter) [commercially available as KR-282 from Shinetsu Chemical Co., Ltd.], 6% of titanium dioxide [commercially available from Hayashi Pure Chemicals Co., Tld., $TiO_2$] and 4% of aluminium oxide [commercially available under FA-6 from Showa Denko K.K.] in admixture with 300 parts of a mixed solvent consisting of, by weight, 50% xylene, 17% of butyl cellosolve and 33% of cellosolve acetate.

(2) Insulating Treatment

For a motor coil of 2.2 KW, two sheets of mica paper of 0.19 mm thickness (commercially available under the trade name of Mica DG78-C from Okabe Mica Industries) with an earth-insulating sheet 14 and interphase-insulating sheet 16, as well as one sheet of mica paper 1.0 mm thickness (commercially available under the trade name of Mica D-581 from Okabe Mica Industries) with a Ni-plated copper conductor double glassfiber winding 18 of 0.85 mm diameter (supplied from the Furukawa Electric Co., Ltd.) and a wedge member 20 were inserted into a slot 12 to form an iron core 10. The iron core thus formed was heated at a temperature of 120° C. for four hours to eliminate moisture in the materials. Then, the iron core was cooled to 40°–50° C. and dipped in a bath containing the impregnating agent described hereinabove for ten minutes. Thereafter, the iron core was removed from the impregnating bath and left at the ambient temperature in the atmosphere for natural drying. Then, the iron core was heated at 80° C. for two hours, then at 120° C. for two hours to eliminate the organic solvent. Thereafter, heatcuring was carried out at 200° C. for two hours to obtain an insulation of the motor coil.

The insulation of the motor coil thus formed has an interphase dielectric strength of 3.92 KV and an earth-insulating strength of 4.32 KV even after exposure at the temperature of 400° C. for 1400 hours, whereas the initial interphase dielectric strength and the initial earth-insulating strength are in the order of 3.95 KV and 3.8 KV, respectively, which indicates that the motor coil thus treated maintains its dielectric strength even over long periods of use.

As described hereinbefore, the coil is impregnated in accordance with the invention with an impregnating agent comprising a suspension in an organic solvent for the organosilicon compound, or silicone resin, of the silicone resin and the synthetic fluoro-mica which impregnating agent after application as an insulant, as described, is heated to remove the organic solvent and then cured at the high temperatures attained in a rotary electric apparatus, such as an electric motor, or upon heating to such high temperatures, i.e. above about 300° C., the fluoro-compound is vaporized from the sythetic fluoro-mica and modifies the properties believed to reduce the melt temperature of the siloxane derived from the organo-silicon compound which then reacts with residual synthetic fluoro-mica to provide the ceramic-like insulation of the invention having improved mechanical and dielectric strength and freedom from thermal degradation at high temperature usage. Especially in the use of insulation for a coil used in a motor, the impregnation within the slot is ensured, prior to elevated temperature heating, due to the small particle size of the synthetic fluoro-mica so that any failure or damage of the insulated coil through vibration or impact may be avoided.

The following table provides the supplier's data applicable to the KR282 silicone resin which may be used in the impregnant of the invention.

| Type | KR-282 |
| --- | --- |
| Appearance | liquid film | pale yellow, transparent smooth surface |
| Non-volatile content (%) | 50.2 |
| Solvent | xylene |
| Viscosity (P. 25° C.) | 1.0–2.0 |
| Acid value (based on non-volatile content) | ≦3.0 |
| Specific gravity, 25° C. | 1.00–0.02 |
| Deposition (mm) Center portion | ≧0.03 |
| Lower portion | lower than 130% of center portion |
| Drying time (hr./°C.) | within 1 hr./200° C. |
| Volume resistivity (Ω-cm) Ordinary | >10^14(?) |
| 180° C. | >10^12(?) |
| Hot water | >10^14(?) |
| Breakdown strength (KV/0.1 mm) Ordinary | >7.5 |
| 180° C. | >6.5 |
| Hot water | >7.0 |
| Bending-resistance (250° C., 3 mmΦ) | >12 hrs. |
| Heat loss (%), (250° C., 72 hrs.) | <7 |
| Drying condition for a testing piece | 280° C./hr. |

While the insulation of the conductive coil for the rotary electric apparatus has been described hereinbefore with reference to the appended drawings, it will be appreciated that the invention is not to be limited thereto and is equally applicable to insulation for the conductive coils used in transformers and the like. Instead of impregnating the core the wire of the core may be cooled by spraying, manual or machine application, molding or other methods in lieu of immersion.

We claim:

1. A ceramic-like insulating material for insulating the windings of a coil, said ceramic-like insulating material being the reaction product of an impregnant comprising a suspension of a silicone resin and a synthetic fluoro-mica in an organic solvent, said reaction product being derived on subjecting the impregnant, after curing, to temperatures above about 300° C. to thermally decompose the silicone resin, evidenced by loss of organic radicals from the silicone resin, with resulting conversion of the resin to polysiloxane which is exposed to a fluoro-compound vaporized from said synthetic fluoro-mica at the same temperature as that at which decomposition of the silicone resin occurs.

2. The insulating material of claim 1, wherein the synthetic fluoro-mica contains devitrified mica glass.

3. The insulating material of claim 1, wherein the silicone resin comprises a polyphenylmethyl silicone.

4. The insulating material of claim 3, wherein said polyphenylmethyl silicone has the follow basic structure

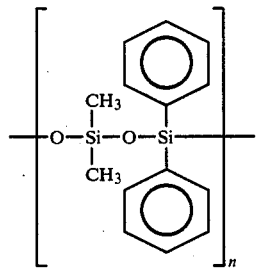

5. A method of forming a ceramic-like insulation on an electrical coil, comprising forming a suspension of synthetic fluoro-mica and a silicone resin in an organic solvent for the resin to form a coil impregnant, impregnating the coil with said impregnant, heat curing the impregnant at a temperature of about 200° C. for between 2 to 15 hours, and further heating the cured impregnated coil at a temperature above 300° C. for up to 1000 hours to form a ceramic-like material having improved mechanical and dielectric properties.

* * * * *